March 1, 1949. C. M. SAVRDA ET AL 2,463,060
FISH-TREATING MACHINE
Filed May 9, 1944 5 Sheets-Sheet 1
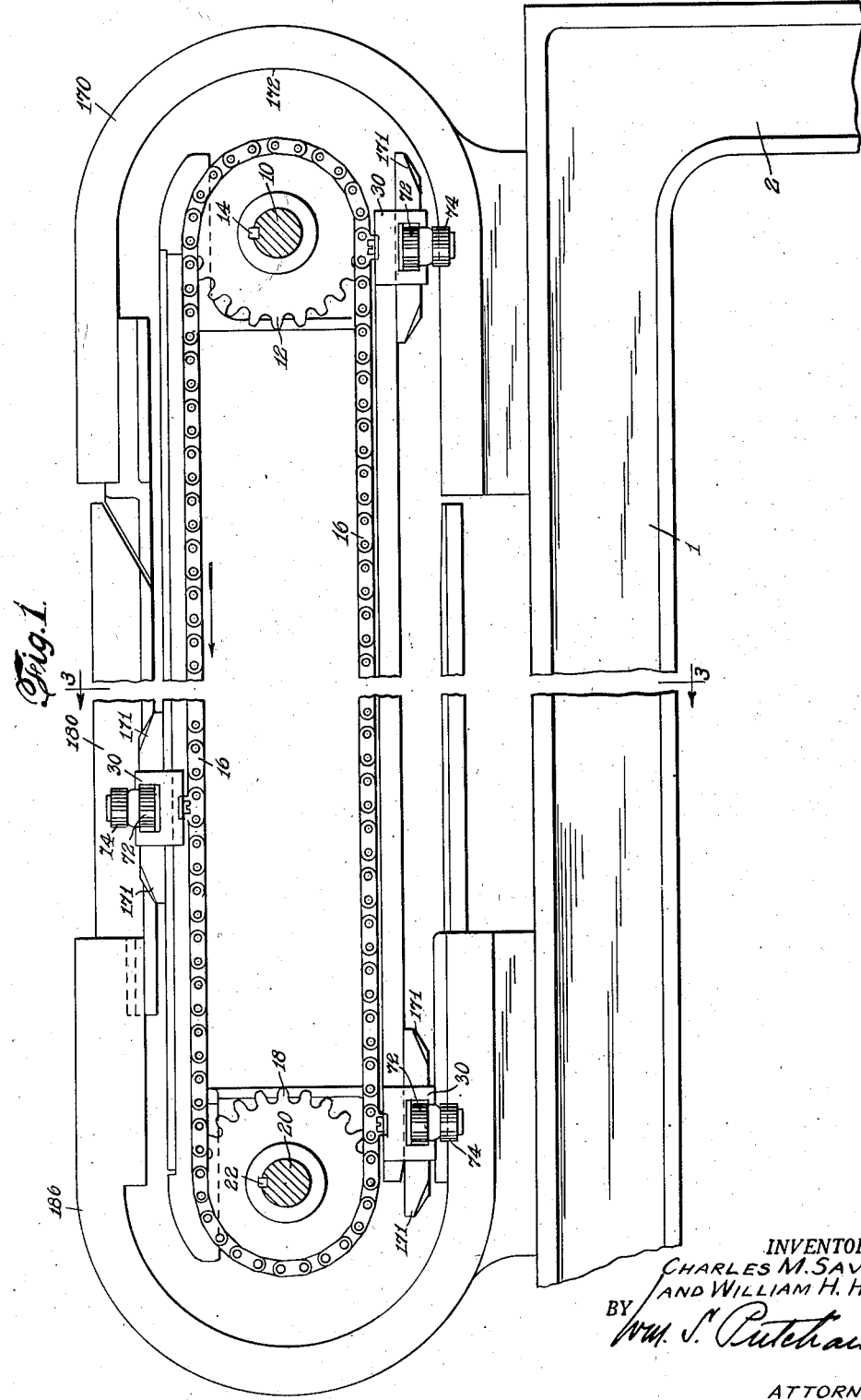
INVENTORS
CHARLES M. SAVRDA
AND WILLIAM H. HUNT
BY
ATTORNEY.

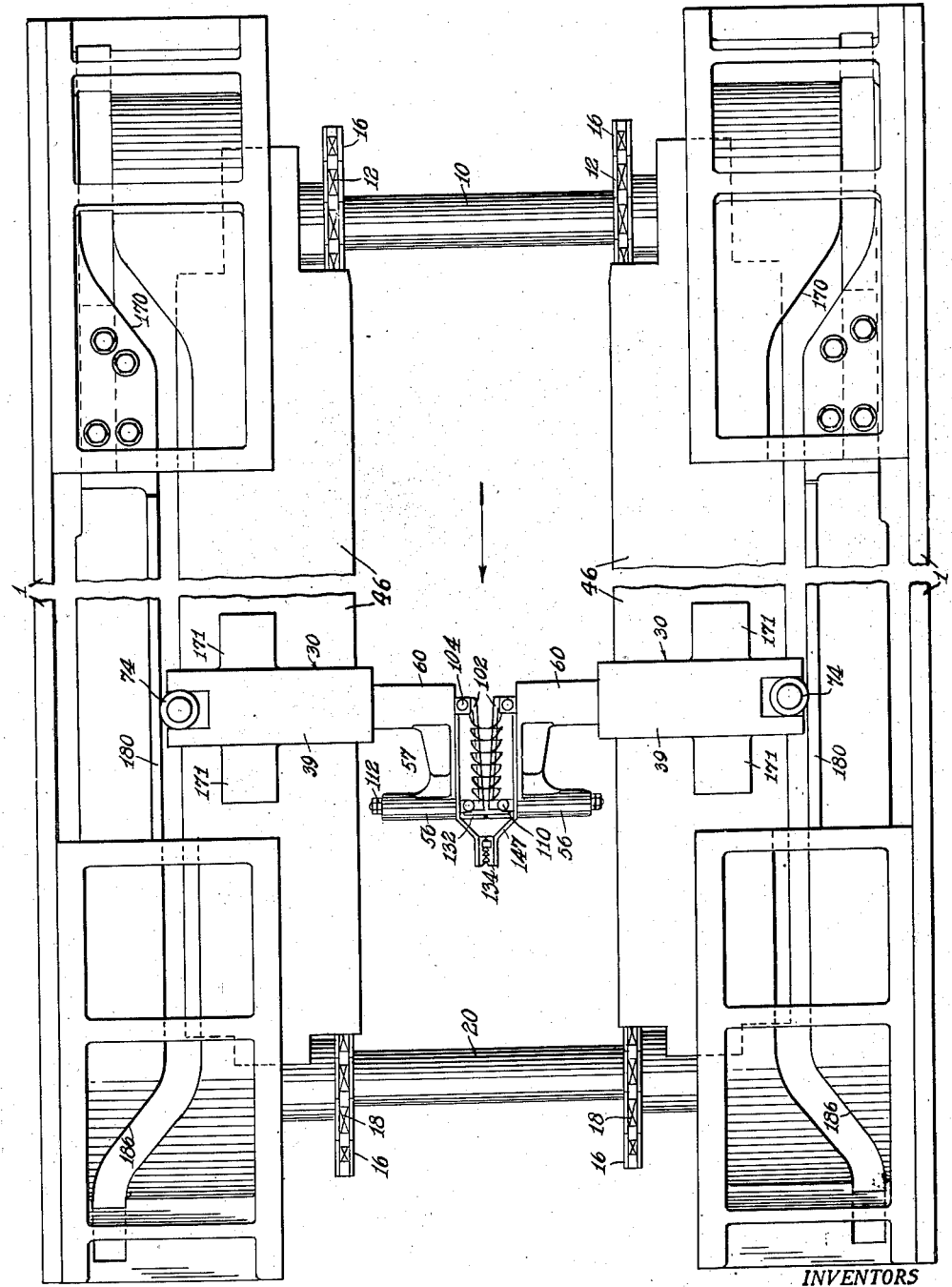

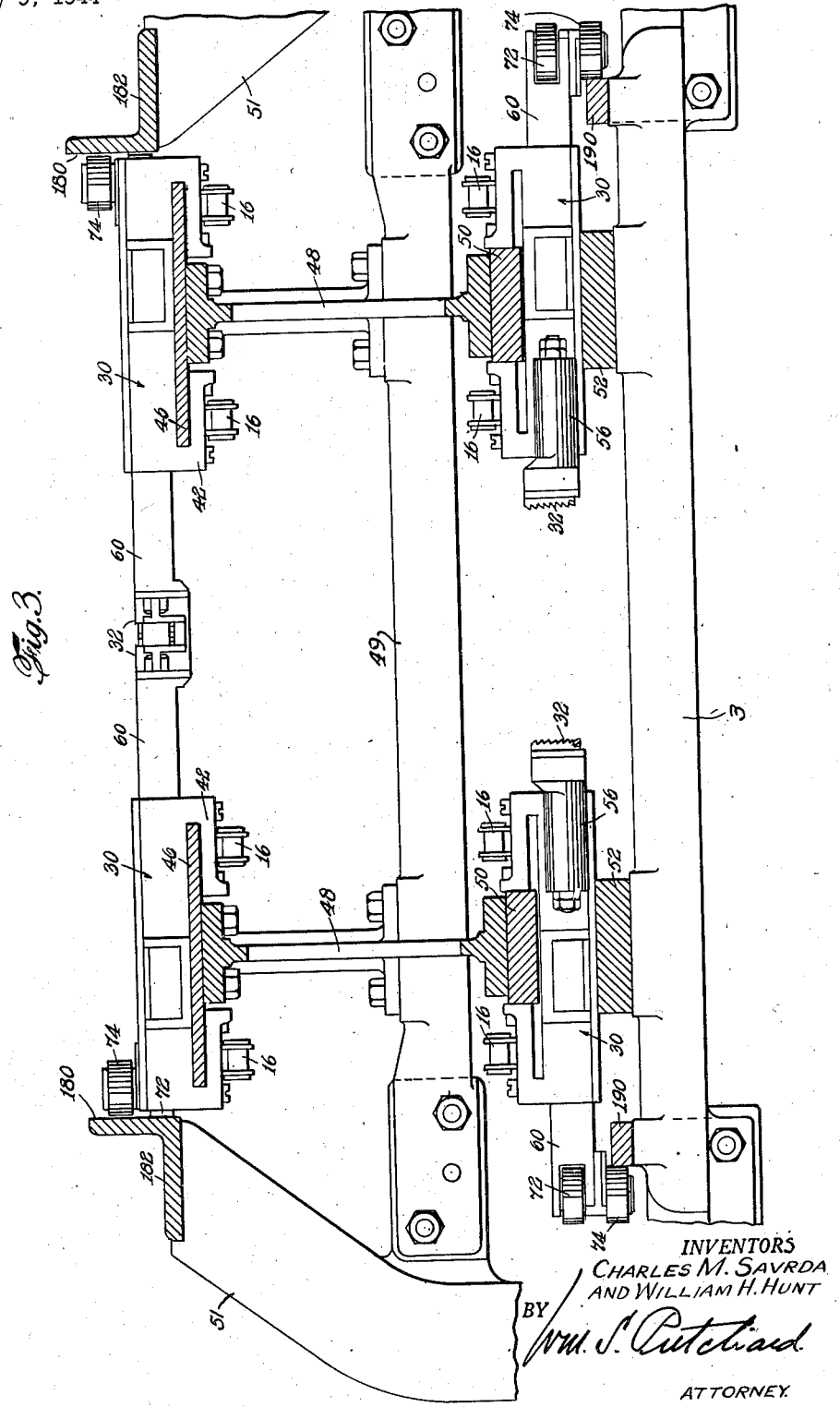

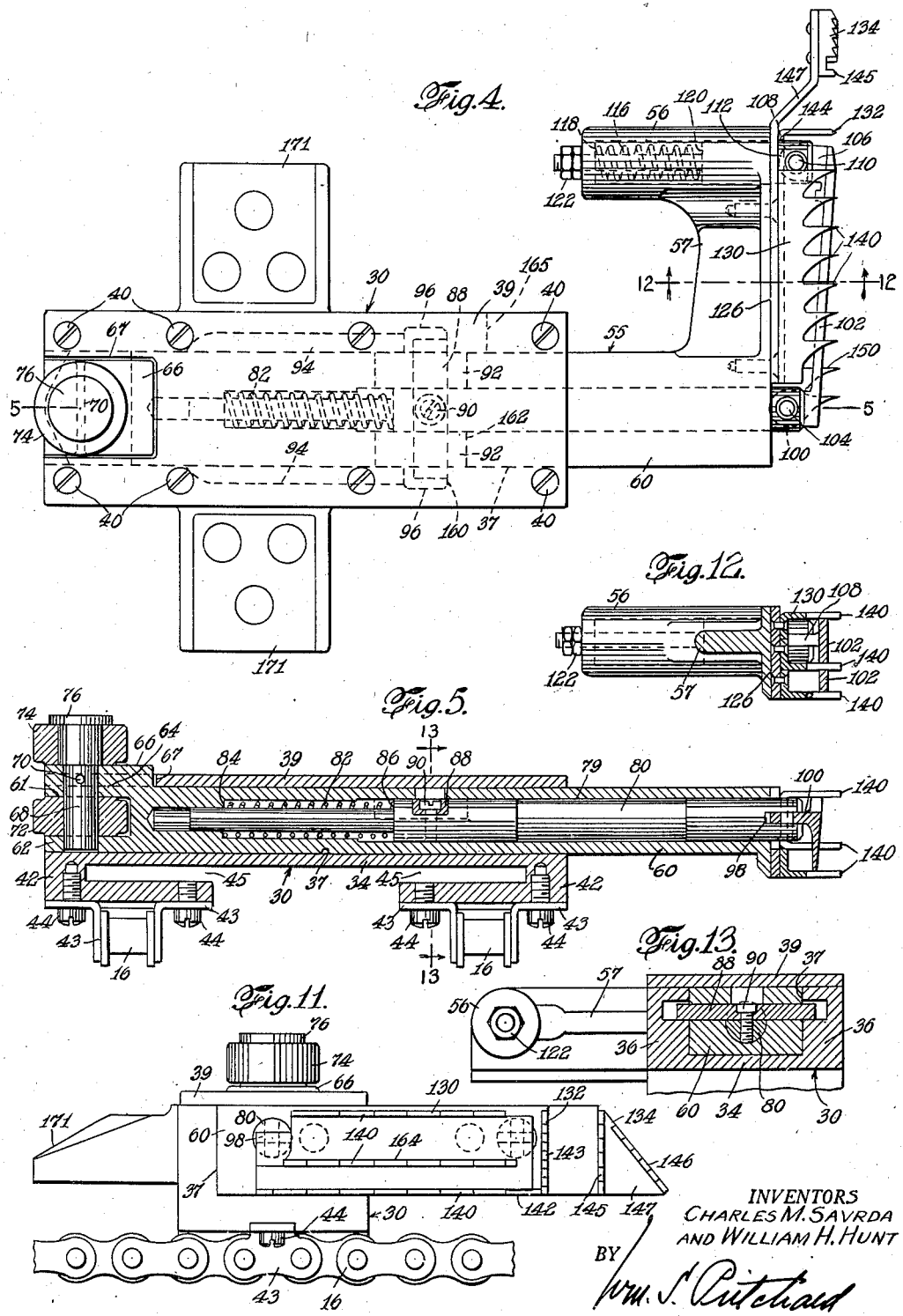

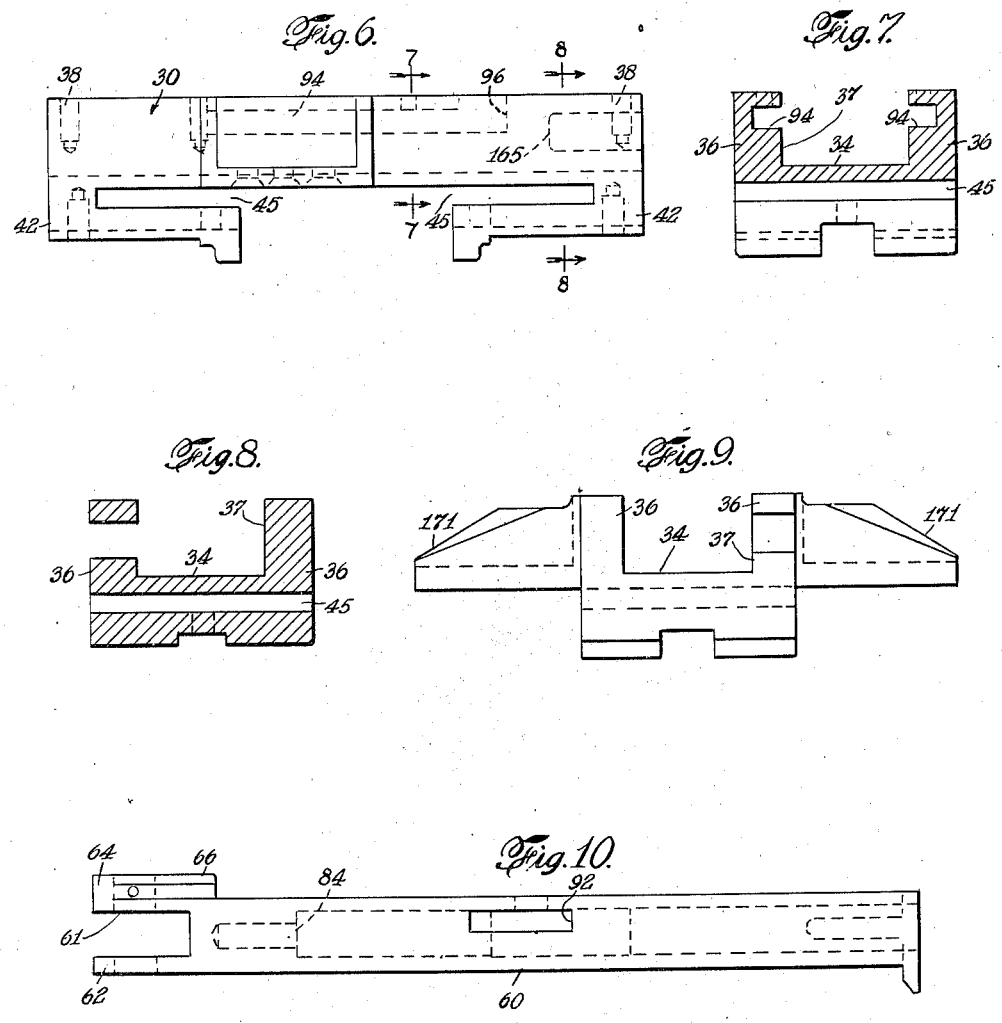

Patented Mar. 1, 1949

2,463,060

UNITED STATES PATENT OFFICE 2,463,060

FISH TREATING MACHINE

Charles M. Savrda, Bay Shore, N. Y., and William H. Hunt, National City, Calif., assignors, by mesne assignments, to Fish Machinery Corporation, Boston, Mass., a corporation of Delaware Application May 9, 1944, Serial No. 534,709

13 Claims. (Cl. 17—3)

1

This invention relates to fish filleting machines, and more particularly to an apparatus to grip a fish adjacent the tail and feed said fish, tail leading and back downward, through a predetermined flight and progressively through stations at which successive operations, such as fin straightening, removing the dorsal fins, and cutting the fish through the back almost to the backbone, are performed, and finally delivering the fish to belly-slitting knives.

United States Patent 2,149,021 discloses a fish filleting machine wherein a fish, tail leading and back downward, after appropriate positioning is gripped adjacent the tail and fed to belly-slicing knives. Prior to delivery to the belly-slicing knives, the fish is fed through means which straighten the fins, after which the fish is slit through the back almost to the backbone and in which condition it is fed to the belly-slicing knives.

United States Patents 2,137,291 and 2,406,907 disclose apparatus for removing the dorsal fins which may be utilized with the filleting machine shown in Patent 2,149,021. When the aforementioned dorsal fin removing mechanisms are utilized in fish filleting machines, the fish, after having the fins thereof straightened, is fed across the dorsal fin remover and, after the dorsal fin has been removed, the fish is cut through the back up to almost the backbone and in such condition fed to the belly-slicing knives.

In each of the aforementioned Patents 2,149,021, 2,137,291 and 2,406,907, the fish-gripping mechanism comprises a pair of oppositely disposed clutching plates, each of which is provided with clutching spikes. The gripping mechanisms are mounted on traveling chains and at predetermined times the clutching plates are actuated toward and away from each other to seize and release a fish respectively. The clutching spikes penetrate the scales on the fish and, when the clutching members of each pair are separated (moved away from each other) to release the fish, the scales frequently remain on the spikes. During continuous operation, the scales accumulate on the spikes, with the result that the clutching spikes are rendered more or less ineffective.

An object of this invention is to provide a new and improved gripper mechanism to grip a fish fed, tail leading and back downward, adjacent the tail thereof and feed the same through a predetermined flight, having spaced stations at which the fish is subjected to successive operations of fin straightening, dorsal fin removing,

2 slitting the fish through the back almost up to the backbone, and finally delivering the fish to the belly-slicing knives.

Another object of this invention is to provide a gripping mechanism which will not be rendered ineffective during continuous use thereof.

Another object of this invention is to provide a gripping mechanism for gripping a fish adjacent the tail thereof, having gripping teeth which cut and penetrate the scales of the fish engaged thereby.

A further object of this invention is to provide a gripping mechanism which will grip and hold a fish adjacent the tail thereof, which is provided with a stripper plate whereby, when the gripper plates are moved away from each other to release the fish, any extraneous matter on the gripping elements will be removed.

A still further object of this invention is to provide a fish gripping mechanism having a stripper plate which maintains the fish in proper position during seizure thereof as well as during passage through the several stations and releases the fish in proper position for passage between the belly-slitting knives.

Additional and further objects of the invention will become apparent hereafter.

The above objects are accomplished, in general, by providing a pair of oppositely disposed and transversely aligned grippers at predetermined positions, each gripper having teeth of a construction which break or cut the scales of a fish and penetrate into the flesh to firmly grip the fish. Each gripper is provided with a slide slidably mounted in a block secured to a pair of endless chains. As will become apparent hereafter, the slide is actuated by cams at predetermined points to move each gripper toward or away from the gripper oppositely disposed thereto, whereby the fish is seized and released at the desired times. Each gripper is also provided with a resiliently mounted stripper plate which yields by the pressure of a fish positioned between aligned grippers to permit the teeth to penetrate the scales and seize and grip said fish. Upon movement of the slides to release a fish held between the grippers, the strippers remove any scales which might adhere to the teeth and at the same time serve to release the fish in proper position for passage between the belly-slitting knives.

The specific details of construction of a preferred embodiment of the invention will now be described in connection with the drawings, wherein an illustrative embodiment thereof is shown and wherein:

Figure 1 is a side elevation of an apparatus constituting the instant invention;

Figure 2 is a top plan view of the apparatus shown in Figure 1;

Figure 3 is a vertical section taken on the line 3—3 of Figure 1;

Figure 4 is a plan view of a gripping element and the block in which it is mounted;

Figure 5 is a longitudinal section taken on the line 5—5 of Figure 4;

Figure 6 is a side elevation of the block;

Figure 7 is a section on the line 7—7 of Figure 6;

Figure 8 is a section on the line 8—8 of Figure 6;

Figure 9 is a view looking to the right in Figure 6;

Figure 10 is a side elevation of the slide, the gripping elements being omitted for clarity;

Figure 11 is an end view looking to the left in Figure 4;

Figure 12 is a section taken on the line 12—12 of Figure 4; and

Figure 13 is a section taken on the line 13—13 of Figure 5.

Referring now to the drawings wherein like reference numerals designate like parts, the reference numerals 1 and 2 designate the side members and legs respectively of the frame of a filleting machine and on which the apparatus constituting this invention is mounted. At one end of the machine, there is provided a shaft 10 mounted in bearings carried by the side members of the frame (not shown). A pair of sprockets 12 is secured, as by a key 14, to the shaft 10, and a pair of chains 16 extends from the sprockets 12 in a substantially horizontal direction to a pair of sprockets 18 secured on a shaft 20 journaled in bearings suitably mounted in the side members (not shown). The sprockets 18 are secured to the shaft 20 by a key 22. Either of the shafts 10 or 20 is driven by means not shown.

Mounted on each pair of chains 16 and transversely aligned are a pair of blocks, generally designated by the reference numeral 30, which carry grippers 32. Several such pairs of blocks are provided as shown in Figure 1. Since the details of construction of each block 30 and each gripper 32 are identical, only one of such blocks and grippers will be described.

Each block 30 is formed of a casting having a horizontal base member 34 provided with a pair of spaced vertical walls 36 extending longitudinally across the length of the base and forming a passage 37 therebetween. For reasons which will become apparent, each wall 36 is provided with a plurality of holes 38, whereby a cover plate 39, which is positioned on the walls 36, is secured in place by screws 40.

Each block 30 is secured to a pair of chains 16 whereby it is conveyed through the apparatus. In the form shown, at each side thereof the horizontal base member 34 of each block 30 is provided with a side extension 42. A pair of lugs 43 secured to opposite sides of a link of the respective chain 16 is appropriately fastened to each side extension 42, as by screws 44. The side extensions 42 of each block 30 terminate below and in spaced relationship to the base 34 of the blocks 30 to provide a channel or passage 45 into which a plate 46 is positioned and over which the blocks travel during the upper flight of the chains 16. As shown in Figure 3, there are two plates 46, one on each side of the machine. Each plate 46 extends longitudinally of the machine adjacent the top flight of the chains 16 and is carried at the top of an I-beam 48. At the bottom, each I-beam 48 carries a guide 50 which guides the block, and a rail 52 mounted on the cross member 3 of the frame supports the block. The guide 50 and the rail 52 extend longitudinally of the machine adjacent the lower flight of the chains. The I-beams 48 are carried on cross beams 49 that are secured to columns 51. It is to be understood that there are two cross beams 49, one adjacent each end of the conveyer.

Each gripper is provided with a slide, generally indicated by the reference numeral 55. As shown in Figure 4, each slide is formed with a small plunger housing 56 carried on one end of a rib 57, which, on its opposite end, carries a large plunger housing 60. In the preferred form, the slide 55 is made of a single casting, though obviously the parts thereof may be made separately and then appropriately secured together.

The large plunger housing 60 is slidably positioned in the passage 37 of a block 30. As shown in the drawings, one end of the large plunger housing 60 is provided with a slot 61 intermediate the end members 62 and 64. The member 64 is provided with a shoulder 66 which is positioned in and extends through a slot 67 in the cover plate 39. Sufficient clearance between the shoulder 66 and the slot 67 is provided to permit the necessary relative movement therebetween. The members 62 and 64, as well as the shoulder 66, are provided with aligned holes in which a shoulder pin 68 is securely positioned. The shoulder pin 68 is also secured in position by means of a flat-headed rivet 70 extending transversely through the shoulder 66 and the pin 68. Two freely rotatable rollers 72 and 74 are mounted on the pin 68. As is apparent from Figure 5, the roller 72 is positioned in the slot 61 and is in alignment with the horizontal longitudinal axis of the plunger housing 60. The roller 74 is seated on the shoulder 66 and is held in position on the pin 68 by means of a head 76.

The plunger housing 60 is provided with a longitudinal bore 79 in which a plunger 80 is positioned. A compression spring 82 is confined between a shoulder 84 in the bore 79 and a shoulder 86 on the plunger 80. As shown in Figure 5, a key 88 extending transversely and positioned in a groove of the plunger 80 is secured thereto by means of a screw 90. The key 88 extends through a pair of aligned slots 92 in the sides of the plunger housing 60. The key 88 also extends into a pair of aligned slots 94 formed in the upstanding ribs 36 of the block 30. As particularly shown in Figures 4 and 6, each of the slots 94 communicates with a relatively large vertical slot 96 at one end thereof whereby the key 88 may be quickly positioned into the slots 94 when the cover plate 39 is removed in the assembly or removal of the parts.

The plunger 80 at the forward end thereof is provided with a slot 98 in which an ear 100 at one end of a stripper plate 102 is secured by a pin 104. The other end of the stripper plate 102 is provided with an ear 106 which is positioned in a slot 108 in one end of a plunger 112 mounted in the small plunger housing 56. A pin 110 secures the ear 106 to the plunger 112. A compression spring 116 is confined between a shoulder 118 of the plunger housing 56 and the shoulder 120 of the plunger 112. A lock nut 122 is adjustably secured on the end of the plunger 112 which extends through and beyond the plunger housing 56 to limit the forward movement of the plunger.

As previously mentioned, the plunger housing 56 is formed integral with the rib 57 which extends laterally from the forward end of the large plunger housing 60. The rib 57 is formed with a face 126 which carries the gripping elements, which will now be described.

As shown in Figure 11, the gripping elements of each gripper are formed of several parts, 130, 132, 134. The gripping element 130 is adapted to engage the side of the fish in the fleshy portion forwardly of the tail; the gripping element 132 is adapted to engage the side of the fish intermediate the fleshy portion and the tail of the fish; and the gripping element 134 is adapted to engage the tail of the fish. In the form shown, the gripping element 130 comprises three spaced horizontal rows of teeth 140 carried on a plate 142. Preferably, the teeth 140 in the upper horizontal row are slightly longer than the teeth in the second row and the teeth in the second row are slightly longer than those in the third or bottom row. By this arrangement, there is provided a slight taper to conform with the shape of the side of the fish engaged to assure gripping of the fish in proper position. The gripping element 132, comprising a single vertical row of teeth 143, is carried on a plate 144, and the gripping element 134, comprising a vertical row of teeth 145 and an angularly disposed row of teeth 146, is carried on a plate 147. As is shown in Figure 4, the plate 147 is secured by means of screws to the face 126, and the plate 142, carrying the teeth 140, and the plate 144, carrying the teeth 143, are secured to the plate 147 in any convenient manner, as by soldering. It is to be noted that the plate 147 is curved so that the teeth 145 and 146 carried thereby will be disposed in position to grip the fish at the tail at which it is intended.

The teeth, and particularly the teeth of the gripping elements which are designed to engage the side of the fish which is provided with scales, are provided with cutting edges 150 whereby, when the fish is gripped between the opposing teeth, the scales will be cut and the teeth will penetrate into the fleshy portion of the meat to firmly seize the same. It is not necessary that the teeth of the grippers 132 and 134 be of such construction, though they may be. So far as the grippers 132 and 134 are concerned, they may be formed of a shape which will seize the portion of the fish disposed therebetween. In general, the gripping elements 130 and 132 seize a fish (tail leading and back downward) at the side thereof and substantially opposite to the backbone.

The stripper plate 102 is provided with a slot 164 in alignment with the center row of teeth 140. The side edges of the stripper plate 102 are in close proximity to the inner edges of the outer rows of teeth 140. As previously mentioned, the stripper plate 102 is yieldably mounted at its ends on the plungers 80 and 112 which are adjacent the respective ends of the rows of teeth 140.

The cross-section of the stripper plate 102 preferably tapers downwardly, as shown in Figure 5. It is not necessary that this taper extend throughout the entire length of the plate. Preferably, it may extend in the neighborhood of one-half of the length of the plate 102, and particularly at that portion which grips the rounded portion of the fish.

From the foregoing details of construction, it is apparent that the plunger housing 60 is slidable in and with respect to the block 30, and the inward movement thereof is limited by the shoulder 66 engaging the edge of the cover plate 39. The spring 82 acting on the plunger 80 maintains the key 88 in engagement with a shoulder 160. The sliding movement of the housing 60 is obtained by appropriate means acting on the roller 74, as hereafter explained. When the grippers are in position to seize a fish, due to the location and size of the slots 92, the edges 162 thereof are spaced from and in advance of the shoulder 160 engaged by the key 88. At this time, the plunger 80 and housing 60 are at their extreme limits of inward movement, and the housing 60 is held stationary by means exerting lateral pressure on the roller 72. When the plunger 80 is at the limit of its inward movement, the exposed surface of the stripper plate 102 is in a plane passing through the tips of the teeth 140. The space between two opposed strippers 102 is generally less than the thickness of a fish. Accordingly, when the opposed housings 60 are moved toward each other to grip a fish fed thereto, the side of the fish will first engage the stripper plates 102 which serve to position the fish properly for the subsequent operations to be performed thereon. The pressure exerted by the fish depresses each stripper plate 102 whereby the plungers 80 and 112 are depressed against the action of the springs 82 and 116 respectively. The depression of the stripper plates 102 permits the teeth 140 to cut the scales and penetrate into the flesh of the fish.

To release the fish, pressure is applied in the appropriate direction to the roller 74, whereupon the plunger housing 60 is retracted. Due to the action of the spring 82, the plunger 80 remains stationary whereby the stripper plate 102 also remains stationary while the toothed member 130 is retracted. This is due to the fact that the slots 92 in the housing will move relative to the key 88 without moving said key and plunger. Any extraneous matter adhering to the teeth is removed by the stripper plates 102. It is, of course, understood that when the ends of the slots 92 engage the key 88 and the housing is further retracted, the plunger will also be retracted against the action of the spring.

The block 30 is also provided with a slot 165 to permit the block to slide over the rib 57 when this becomes necessary.

In operation, the chains 16 to which the blocks 30 are secured travel in the direction of the arrow shown in Figure 1. As the blocks 30 travel around the sprocket wheels 12, the rollers 74 travel in cams 170 mounted on the frame. For the purpose of preventing the lateral displacement of the blocks as they pass around the sprockets 12, each block 30 is provided with shoes 171 which pass along the arcuate cam surface 172. Figure 4 illustrates generally the relation of parts when the blocks travel around the sprocket wheels. The shape of the cams 170 is such as to cause the plunger housings 60 of each aligned pair to move toward each other into gripping relationship to grip a fish which has been fed in position so that it can be gripped, tail leading and back downward. At this time, also, the roller 72 engages the camming member 180 of the angle member 182 appropriately mounted in the machine and which serves to maintain the plunger housings 60 stationary so that the gripping action and depression of the stripper plates may be effected. The fish thus gripped is fed through the fin-straightening mechanism and dorsal fin-removing mechanism (not shown) and up to the belly-slitting knives (also not shown). The camming surface 180 communicates with a cam 186 which exerts a lateral pressure on the roller 72 whereby the housings 60 are retracted to release the fish, as previously described. The blocks then pass around the sprockets 18, and on the lower flight the blocks travel over the rails 50 and 52. A rail 190 cooperates with the roller 74 to maintain the slide in retracted position during the lower flight until the chains 16 pass around the sprockets 12 in the manner previously described. During movement through the lower flight, the roller 72 may be made to engage means to actuate the dorsal fin-removing device, as described in copending application Serial No. 525,546.

Since it is obvious that various changes and modifications may be made in the above description without departing from the nature or spirit thereof, this invention is not restricted thereto except as set forth in the appended claims.

We claim:

1. In a fish treating machine, a pair of oppositely disposed and transversely aligned grippers, means to move said grippers in a defined path, and means to move said grippers toward and away from each other, each of said grippers having teeth provided with cutting edges adapted to cut the scales of a fish engaged therebetween and penetrate into the flesh thereof.

2. In a fish treating machine, a pair of oppositely disposed and transversely aligned grippers, means to move said grippers in a defined path, and means to move said grippers toward and away from each other, each of said grippers having means to engage a fish, tail leading and back downward, at the tail and at the sides adjacent to but in advance of said tail, the portions of said grippers, which engage the opposite sides of the fish in advance of the tail, having teeth provided with cutting edges adapted to cut the scales of a fish engaged therebetween and penetrate into the flesh.

3. In a fish treating machine, a pair of oppositely disposed and transversely aligned grippers, means to move said grippers in a defined path, and means to move said grippers toward and away from each other, each of said grippers having means to engage a fish, tail leading and back downward, at the tail comprising a vertical row of teeth and a row of teeth angularly disposed thereto, a vertical row of teeth in front of said tail grippers, and means in front of said vertical row of teeth comprising a plurality of rows of teeth to engage the side of said fish.

4. In a fish treating machine, a pair of oppositely disposed and transversely aligned grippers, means to move said grippers in a defined path, each gripper having gripping elements to seize a fish and a yieldingly mounted stripper plate associated with said gripping elements, means to move said grippers toward and away from each other to respectively seize and release a fish, and means to move said stripper plate out of contact with the fish after the gripper associated therewith has released said fish.

5. In a fish treating machine, a pair of oppositely disposed and transversely aligned grippers, means to move said grippers in a defined path, each gripper having gripping elements to seize a fish and a movable stripper plate associated with said gripping elements, means to move said grippers toward and away from each other to respectively seize and release a fish, means to move said stripper plate, and means to delay the movement of said stripper plate during the fish-releasing operation until the gripping elements have been withdrawn from said fish.

6. In a fish treating machine, a pair of oppositely disposed and transversely aligned grippers, means to move said grippers in a defined path, each gripper having gripping elements to seize a fish and a movable stripper plate associated with said gripping elements, means to move said grippers toward and away from each other to respectively seize and release a fish, means to move said stripper plate, and means to maintain said stripper plate in contact with the fish during the fish-releasing operation.

7. In a fish treating machine, a pair of oppositely disposed and transversely aligned grippers, means to move said grippers in a defined path, each gripper having a toothed element to seize a fish and a yieldingly mounted stripper plate associated with said toothed element and adapted to engage a fish at the side thereof, and means to position said stripper plate to engage the side of a fish adjacent the tail thereof and position said fish prior to seizure by said toothed element and maintain the fish in said position during release by said toothed element.

8. In a fish treating machine, a pair of oppositely disposed and transversely aligned grippers, means to move said grippers in a defined path, each gripper having a toothed element to seize a fish and a yieldingly mounted stripper plate associated with said toothed element and adapted to be moved laterally by the pressure of the side of a fish and permit said toothed element to seize said fish, means to move said grippers toward and away from each other to respectively seize and release a fish, and means to maintain said stripper plate in contact with the side of a fish until at least the toothed element has been withdrawn therefrom.

9. In a fish treating machine, a pair of oppositely disposed and transversely aligned blocks, means securing said blocks to endless conveyers moving in a defined path, each of said blocks having a channel extending therethrough, a slide having a plunger housing slidably disposed in said channel, a plunger in said housing, said slide having a second plunger housing spaced from the first-named housing, a plunger in said second housing, fish-gripping means on said slide adjacent said plunger housings, a stripper plate carried by said plungers, means to move the slides toward and away from each other to respectively grip a fish at the sides thereof and release the same, and means maintaining said stripper plate in contact with the fish until at least the gripping means release said fish.

10. In a fish treating machine, a pair of oppositely disposed and transversely aligned blocks, means securing said blocks to endless conveyers moving in a defined path, each of said blocks having a channel extending therethrough, a slide having a plunger housing slidably disposed in said channel, a spring-pressed plunger in said housing, said slide having a second plunger housing spaced from the first-named housing, a spring-pressed plunger in said second housing, toothed gripping means on said slide adjacent said plunger housings adapted to grip a fish at the side thereof, a stripper plate carried by said plungers, means to move the slides toward and away from each other to respectively grip a fish at the sides thereof and release the same, and means maintaining said stripper plate in contact with the fish until at least the toothed gripping means release said fish.

11. In a fish treating machine, a pair of oppositely disposed and transversely aligned blocks, means securing said blocks to endless conveyers moving in a defined path, each of said blocks having a channel extending therethrough, a slide having a plunger housing slidably disposed in said channel, a spring-pressed plunger in said housing, said slide having a second plunger housing spaced from the first-named housing, a spring-pressed plunger in said second housing, fish-gripping means on said slide adjacent said plunger housings, a stripper plate carried by said plungers and adapted to contact said fish at the side thereof opposed thereto to position and maintain the fish in proper position, means to move the slides toward and away from each other to respectively grip a fish at the sides thereof and release the same, and means withdrawing said stripper plate from contact with the fish after the gripping means have released said fish.

12. In a fish treating machine, a pair of oppositely disposed and transversely aligned blocks, means securing said blocks to endless conveyers moving in a defined path, each of said blocks having a channel extending therethrough, a slide having a plunger housing slidably disposed in said channel, a spring-pressed plunger in said housing, a transversely extending key secured to said plunger and slidably positioned in slots in said housing and channel, means to limit the movement of said key in the slots in the channels in one direction and position said key intermediate the ends of the housing slots, said slide having a second plunger housing, a spring-pressed plunger in said second housing, toothed gripping means on said slide adjacent said plunger housings to grip a fish at the side thereof opposed thereto, a stripper plate carried by said plungers and adapted to maintain the fish in proper position, and means to move said slides toward and away from each other at predetermined times.

13. In a fish treating machine, a pair of oppositely disposed and transversely aligned grippers, means to move said grippers in a defined path, means to move said grippers toward and away from each other, each of said grippers having means to engage a fish, tail leading and back downward, at the tail and at the sides adjacent to but in advance of said tail, each of the portions of said grippers which engage the opposite sides of the fish in advance of the tail comprising a plurality of rows of teeth arranged to conform with the shape of the side of the fish engaged thereby, the teeth in each row being provided with cutting edges adapted to cut the scales of a fish engaged therebetween and penetrate into the flesh.

CHARLES M. SAVRDA.
WILLIAM H. HUNT.

REFERENCES CITED

The following references are of record in the file of this patent:

UNITED STATES PATENTS

| Number | Name | Date |
| --- | --- | --- |
| 1,175,601 | Carson | Mar. 14, 1916 |
| 1,223,468 | Brierly et al. | Apr. 24, 1917 |
| 2,100,770 | Wachowski | Nov. 30, 1937 |
| 2,105,207 | Ullin | Jan. 11, 1938 |
| 2,137,291 | Hunt | Nov. 22, 1938 |
| 2,184,450 | Elliott | Dec. 26, 1939 |